United States Patent
Lee

(10) Patent No.: US 10,250,560 B2
(45) Date of Patent: Apr. 2, 2019

(54) NETWORK SECURITY METHOD AND DEVICE USING IP ADDRESS

(71) Applicant: SOOSAN INT Co., Ltd., Seoul (KR)

(72) Inventor: Yong Hwan Lee, Seoul (KR)

(73) Assignee: SOOSAN INT CO., LTD., Seoul (KR)

(*) Notice: Subject to any disclaimer, the term of this patent is extended or adjusted under 35 U.S.C. 154(b) by 160 days.

(21) Appl. No.: 15/024,131

(22) PCT Filed: Sep. 26, 2014

(86) PCT No.: PCT/KR2014/009027
§ 371 (c)(1),
(2) Date: Mar. 23, 2016

(87) PCT Pub. No.: WO2015/046951
PCT Pub. Date: Apr. 2, 2015

(65) Prior Publication Data
US 2016/0241517 A1  Aug. 18, 2016

(30) Foreign Application Priority Data
Sep. 27, 2013 (KR) .................. 10-2013-0115573

(51) Int. Cl.
*H04L 9/00* (2006.01)
*H04L 29/06* (2006.01)

(52) U.S. Cl.
CPC ........... *H04L 63/0236* (2013.01); *H04L 9/00* (2013.01); *H04L 63/107* (2013.01)

(58) Field of Classification Search
None
See application file for complete search history.

(56) References Cited

U.S. PATENT DOCUMENTS

| | | | | |
|---|---|---|---|---|
| 7,051,369 B1* | 5/2006 | Baba | ............ | H04L 63/02 |
| | | | | 726/22 |
| 7,536,548 B1* | 5/2009 | Batke | ............ | H04L 63/061 |
| | | | | 713/166 |

(Continued)

FOREIGN PATENT DOCUMENTS

| | | | |
|---|---|---|---|
| KR | 20080057161 A | | 6/2008 |
| KR | 20090002044 A | * | 1/2009 |

(Continued)

OTHER PUBLICATIONS

Kark Schaffarczyk, Explainer: what is geoblocking? Apr. 17, 2013, http://theconversation.com/explainer-what-is-geoblocking-13057.*

*Primary Examiner* — Farid Homayounmehr
*Assistant Examiner* — Thanh T Le
(74) *Attorney, Agent, or Firm* — Kolisch Hartwell, P.C.

(57) ABSTRACT

The present invention provides a network security method, which comprises the steps of: maintaining information on blocked countries, to be blocked from data communication, in a blocked country database; identifying an external IP address by extracting at least one of a source IP address and a destination IP address of a communication packet transmitted on a network; identifying a country to which the identified external IP address belongs; and blocking the communication packet when the country to which the identified external IP address belongs is included in the blocked countries.

2 Claims, 7 Drawing Sheets

(56) References Cited

U.S. PATENT DOCUMENTS

| | | | | |
|---|---|---|---|---|
| 7,644,286 B1* | 1/2010 | Mohr | ............... | G06F 21/6209 713/185 |
| 8,001,601 B2* | 8/2011 | Duffield | ............. | H04L 63/1458 713/188 |
| 8,347,088 B2* | 1/2013 | Moore | .................. | G06Q 50/00 713/166 |
| 8,584,226 B2* | 11/2013 | Kudla | ................ | H04L 63/0263 726/13 |
| 8,745,719 B2* | 6/2014 | Kitahama | .......... | H04L 63/0263 726/11 |
| 2002/0066034 A1* | 5/2002 | Schlossberg | ......... | G06F 21/552 726/23 |
| 2002/0107953 A1* | 8/2002 | Ontiveros | .............. | H04L 43/06 709/224 |
| 2002/0133586 A1* | 9/2002 | Shanklin | ................ | H04L 43/00 709/224 |
| 2002/0174362 A1* | 11/2002 | Ullmann | ............ | H04L 41/0213 726/13 |
| 2005/0086502 A1* | 4/2005 | Rayes | .................... | H04L 63/20 713/189 |
| 2005/0198519 A1* | 9/2005 | Tamura | ................. | H04L 63/1408 713/188 |
| 2005/0289649 A1* | 12/2005 | Mitomo | ................. | H04L 63/10 726/22 |
| 2006/0259950 A1* | 11/2006 | Mattsson | ........... | G06F 21/6227 726/1 |
| 2006/0265760 A1* | 11/2006 | Daemke | ............... | G06F 21/604 726/27 |
| 2008/0222705 A1* | 9/2008 | Goodmon | ............. | H04H 60/51 726/4 |
| 2009/0178116 A1* | 7/2009 | Nagoya | ................. | G06Q 10/10 726/3 |
| 2010/0042734 A1* | 2/2010 | Olafsson | ............ | H04L 63/0236 709/229 |
| 2011/0162060 A1* | 6/2011 | Vijayakumar | ........ | H04L 12/413 726/13 |
| 2011/0258694 A1* | 10/2011 | Wu | ....................... | H04L 43/028 726/13 |
| 2012/0023090 A1* | 1/2012 | Holloway | ............... | H04L 67/28 707/709 |
| 2012/0030767 A1* | 2/2012 | Rippert, Jr. | ........... | G06Q 10/10 726/25 |
| 2012/0253957 A1* | 10/2012 | Bakshi | .................. | H04L 63/107 705/18 |
| 2013/0081103 A1* | 3/2013 | Uner | ...................... | G06F 21/56 726/1 |
| 2013/0152153 A1* | 6/2013 | Weiser | ................ | H04L 63/0236 726/1 |
| 2013/0167193 A1* | 6/2013 | Brookins | ............... | H04L 63/20 726/1 |
| 2013/0198065 A1* | 8/2013 | McPherson | ......... | H04L 61/1511 705/40 |
| 2014/0253093 A1* | 9/2014 | Bermudez Rodriguez | .................. | G06F 1/18 324/76.11 |
| 2015/0163224 A1* | 6/2015 | Kim | .................... | H04L 63/1441 726/27 |
| 2015/0229609 A1* | 8/2015 | Chien | .................. | H04L 63/101 726/13 |
| 2017/0237748 A1* | 8/2017 | Kudla | ................ | H04L 63/0263 726/4 |
| 2018/0004765 A1* | 1/2018 | Holloway | ........... | H04L 63/1416 |

FOREIGN PATENT DOCUMENTS

| | | | |
|---|---|---|---|
| KR | 20090002044 A | * | 1/2009 |
| KR | 101116780 B1 | | 2/2012 |
| KR | 20120102913 A | | 9/2012 |
| KR | 20130006912 A | | 1/2013 |
| KR | 20130035569 A | | 4/2013 |

* cited by examiner

FIG. 3

| Country | IP address |
|---|---|
| Korea | 192.168.7.190<br>192.168.0.191<br>XXX.XXX.XXX.XXX<br>⋮ |
| The U.S. | 222.122.195.5<br>123.123.123.123<br>XXX.XXX.XXX.XXX<br>⋮ |
| China<br>⋮ | ⋮ |

FIG. 4

| Country | Whether to block |
|---------|------------------|
| Korea   | X                |
| The U.S.| O                |
| Syria   | O                |
| China   | O                |
| ⋮       | ⋮                |

FIG. 5

| Country | User ID | PC IP address | Communication protocol | Port | Whether to block |
|---|---|---|---|---|---|
| Korea | ABC | 192.168.7.190 | TCP | 70 | X |
| | | | HTTP | 80 | O |
| | AAA | xxx.xxx.xxx.xxx | SMTP | 88 | X |
| | | | | | O |
| ... | ... | ... | ... | ... | ... |

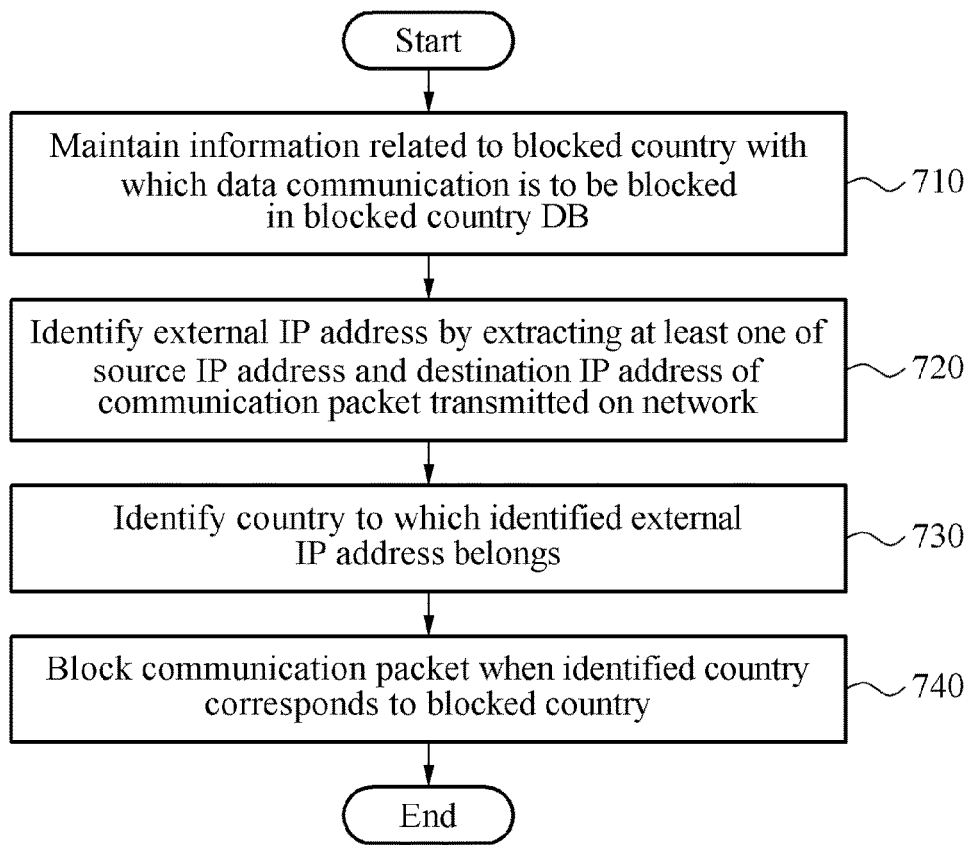

NETWORK SECURITY METHOD AND DEVICE USING IP ADDRESS

TECHNICAL FIELD

Embodiments of the present invention relate to a method of blocking communication using information related to an IP address of a communication packet transmitted on a network.

BACKGROUND ART

With the development of information and communications technology, the information-oriented society has arrived. In all the social, cultural, and economic fields, Internet acts as a significant medium. Enterprises process all tasks through intranets, and thus network management became the most significant issue. In general, network management includes configuration management, error management, performance management, security management, account management, and automatic analysis. Various network management protocols have been set and recommended by the International Organization for Standardization, and a number of Internet Protocol (IP)-based network management systems are being developed.

Korean Patent Application Publication No. 2012-0102913 relates to an apparatus and method for restricting an accessing area of a game user using a routing point that may effectively block an access from another country, and suggests technology that may accurately identify an access attempt from another country although a user located in the other country detours to access a game server through a domestic virtual private network server or a proxy server. Accordingly, technology that blocks communication with a security threatening country based on information related to an IP address of a communication packet transmitted on a network, in addition to a game, is needed.

DISCLOSURE OF INVENTION

Technical Goals

An aspect of the present invention provides a method that blocks communication with a security threatening country based on an Internet Protocol (IP) address of a communication packet transmitted on a network.

Technical Solutions

According to an aspect of the present invention, there is provided a network security method including maintaining information related to a blocked country with which data communication is to be blocked, in a blocked country database (DB), identifying an external Internet Protocol (IP) address by extracting at least one of a source IP address and a destination IP address of a communication packet transmitted on a network, identifying a country to which the identified external IP address belongs, and blocking the communication packet when the identified country corresponds to the blocked country.

The identifying of the country to which the identified external IP address belongs may include maintaining a country and an IP address corresponding to the country in a country-by-country IP DB, and identifying a country corresponding to the identified external IP address by referring to the country-by-country IP DB.

The maintaining may include registering a first country as the blocked country in the blocked country DB when at least a predetermined number of packets are received from the first country during a predetermined time period.

The maintaining may include registering a first country as the blocked country in the blocked country DB when at least a predetermined number of packets are transmitted to the first country during a predetermined time period.

The maintaining may include registering all countries as blocked countries in the blocked country DB, and excluding a first country from the blocked countries in the blocked country DB when at least a predetermined number of packets are transmitted to or received from the first country during a predetermined time period.

The excluding may include displaying a first country to an administrator when at least a predetermined number of packets are transmitted to or received from the first country during a predetermined time period, and excluding the first country from the blocked countries in the blocked country DB in accordance with an instruction of the administrator.

According to another aspect of the present invention, there is also provided a network security method including maintaining information related to a blocked country with which data communication is to be blocked, in a blocked country DB, in association with at least one of a user identifier, a user IP address, a communication protocol, and a communication port, identifying an external IP address by extracting at least one of a source IP address and a destination IP address of a communication packet transmitted on a network, extracting at least one of a user identifier, a user IP address, a communication protocol, and a communication port of the communication packet, identifying a country to which the external IP address belongs, and determining whether at least one of the source IP address and the destination IP address of the communication packet is maintained in the blocked country DB in association with the blocked country when the identified country corresponds to the blocked country.

The network security method may further include blocking the communication packet when at least one of the source IP address and the destination IP address of the communication packet is maintained in the blocked country data base in association with the blocked country.

According to still another aspect of the present invention, there is also provided a network security device including a blocked country DB configured to maintain information related to a blocked country with which data communication is to be blocked, an extractor configured to extract at least one of a source IP address and a destination IP address of a communication packet transmitted on a network, and a controller configured to identify a country to which the extracted IP address belongs to, and block the communication packet when the identified country corresponds to the blocked country.

The controller may be configured to register a first country as the blocked country in the blocked country DB when at least a predetermined number of packets are received from the first country during a predetermined time period.

The controller may be configured to register a first country as the blocked country in the blocked country DB when at least a predetermined number of packets are transmitted to the first country during a predetermined time period.

The controller may be configured to register all countries as blocked countries in the blocked country DB, and exclude a first country from the blocked countries in the blocked country DB when at least a predetermined number of packets are transmitted to or received from the first country during a predetermined time period.

Advantageous Effect

According to embodiments of the present invention, communication with a security threatening country may be blocked using a blocked country database (DB) and a country-by-country Internet Protocol (IP) DB, based on an IP address of a communication packet transmitted on a network.

BRIEF DESCRIPTION OF DRAWINGS

FIG. 3 illustrates an example of a country-by-country Internet Protocol (IP) database (DB) according to an embodiment of the present invention.

FIG. 4 illustrates an example of a blocked country DB according to an embodiment of the present invention.

FIG. 5 illustrates another example of a blocked country DB according to an embodiment of the present invention.

FIG. 6 illustrates an example of a structure of a communication packet according to an embodiment of the present invention.

FIG. 7 is a flowchart illustrating a network security method of a network security device according to an embodiment of the present invention.

BEST MODE FOR CARRYING OUT THE INVENTION

Hereinafter, reference will now be made in detail to embodiments of the present invention with reference to the accompanying drawings.

Figure 1:
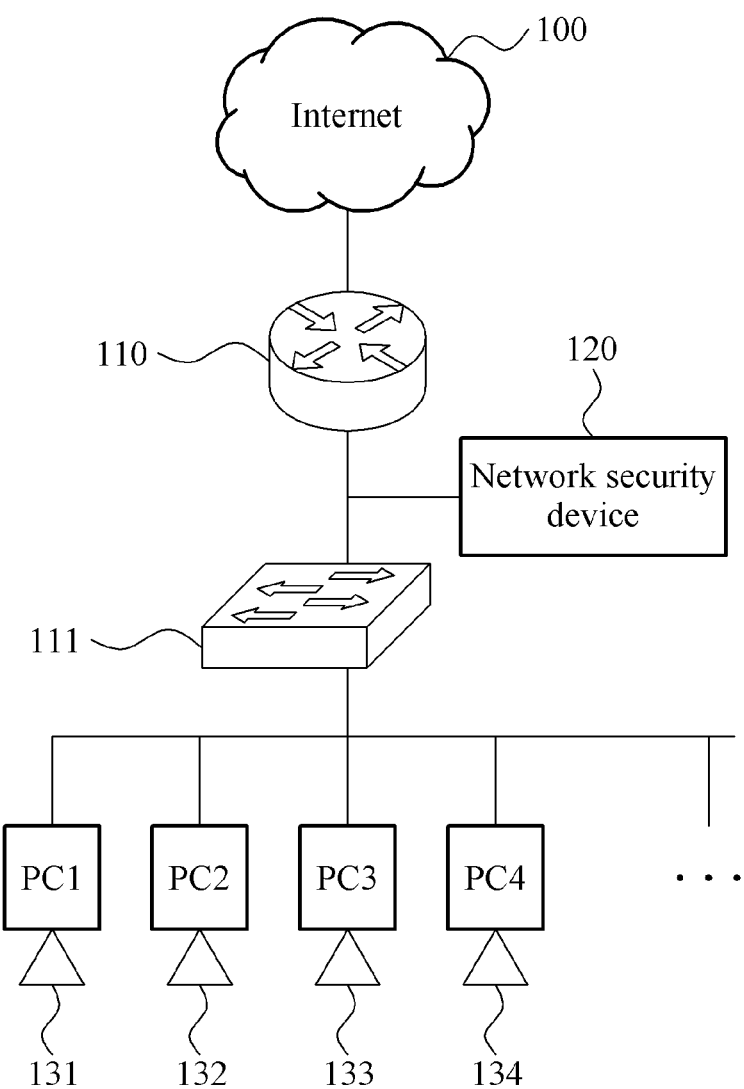
FIG. 1 illustrates an operation of a network security device according to an embodiment of the present invention.

FIG. 1 illustrates an operation of a network security device according to an embodiment of the present invention.

A network security device 120 may identify an external Internet Protocol (IP) address by extracting at least one of a source IP address and a destination IP address of a communication packet transmitted on the Internet 100. Referring to FIG. 6, a communication packet may include a source IP address and a destination IP address, and may also include fields of identification, a protocol, a checksum, and a TTL. The communication packet will be described in detail with reference to FIG. 6.

In this example, source IP addresses of communication packets transmitted to a plurality of personal computers (PCs) 131, 132, 133, and 134 through the Internet 100 are external IP addresses, and destination IP addresses of the communication packet are internal IP addresses. Further, source IP addresses of communication packets transmitted from the plurality of PCs 131, 132, 133, and 134 through the Internet 100 are internal IP addresses, and destination addresses of the communication packets are external IP addresses. In the Internet 100, when an access in one direction is allowed, an access in a reverse direction may also be allowed. Internal IP addresses may be IP addresses used by communication devices within a network to be protected, and external IP addresses may be IP addresses used by communication devices out of the network to be protected.

In FIG. 1, the network security device 120 may be installed between a router 110 and a switch 111 to copy packets being transmitted or received, and inspect the packets. In another example, the network security device 120 may be connected to the router 110 or the switch 111. The network security device 120 may identify a country to which a copied IP address belongs through a country-by-country IP database (DB), and identify a country to be blocked, the country corresponding to the IP address, through a blocked country DB. The country-by-country IP DB will be described with reference to FIG. 3, and the blocked country DB will be described with reference to FIGS. 4 and 5.

Accordingly, the network security device 120 may block the communication packet when the identified country corresponds to a blocked country, and may allow the communication packet to pass when the identified country does not correspond to the blocked country.

Figure 2:
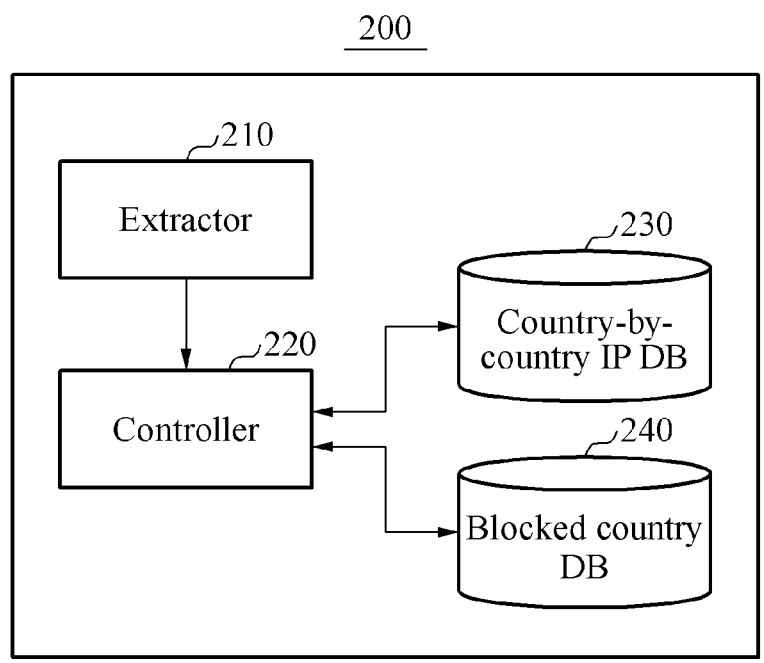
FIG. 2 is a block diagram illustrating a configuration of a network security device according to an embodiment of the present invention.

FIG. 2 is a block diagram illustrating a configuration of a network security device according to an embodiment of the present invention.

A network security device 200 may include an extractor 210, a controller 220, a country-by-country IP DB 230, and a blocked country DB 240.

The extractor 210 may extract at least one of a source IP address and a destination IP address of a communication packet transmitted on a network. In an example, both the source IP address and the destination IP address may be extracted. When the communication packet is an outbound packet going out to an external network, only the destination IP address may be extracted. When the communication packet is an inbound packet coming in an internal network, only the source IP address may be extracted. Referring to FIG. 6, a source IP address and a destination IP address of an IP packet are positioned in determined fields. Thus, the source IP address and/or the destination IP address may be extracted from the IP packet using the fields.

The controller 220 may identify a country to which the extracted IP address belongs, and block the communication packet when the identified country corresponds to the blocked country. In this example, the country to which the extracted IP address belongs may be identified through the country-by-country IP DB 230, and whether the identified country corresponds to the blocked country may be verified through the blocked country DB 240.

For example, when the country to which the extracted IP address belongs corresponds to Korea by referring to the country-by-country IP DB 230, whether Korea is blocked may be verified by referring to the blocked country DB 240. When Korea does not correspond to the blocked country, the communication packet may be allowed. Further, when the country to which the extracted IP address belongs corresponds to the U.S. by referring to the country-by-country IP DB 230, whether the U.S. is blocked may be verified by referring to the blocked country DB 240. When the U.S. corresponds to the blocked country, the communication packet may be blocked.

The controller 220 may register a first country as the blocked country in the blocked country DB 240 when at least a predetermined number of packets are received from the first country during a predetermined time period. For example, when at least 1,000 packets are received from Syria for five minutes in a DDoS attack, Syria may be stored as the blocked country in the blocked country DB 240.

The controller 220 may register a first country as the blocked country in the blocked country DB 240 when at least a predetermined number of packets are transmitted to the first country during a predetermined time period. For example, when assuming that a PC of a user 2, among a plurality of PCs, is used for a DDoS attack, at least 5,000 packets may be transmitted from the PC of the user 2 to China for ten minutes. In this example, by registering China as the blocked country in the blocked country DB 240, transmission of DDoS attack packets from the PC of the user 2 to China may be prevented.

The controller 220 may register all countries as blocked countries in the blocked country DB 240, and exclude a first country from the blocked countries in the blocked country DB 240 when at least a predetermined number of packets, for example, 1,000 packets, are transmitted to or received from the first country during a predetermined time period, for example, for one month. In this example, when at least the predetermined number of packets are transmitted to or received from the first country during the predetermined time period, the controller 220 may display the first country to an administrator, and exclude the first country from the blocked countries in the blocked country DB 240 in accordance with an instruction of the administrator. For example, in a case of initially installing the network security device 200, all countries may be registered in the blocked country DB 240. In another example, several major countries including, for example, Korea, the U.S., and Japan may be excluded from the blocked countries, and all the remaining countries may be registered in the blocked country DB 240. In this example, "Sweden" may also be registered in the blocked country DB 240. Then, a number of packets transmitted to or received from a predetermined country may be recorded at an interval of one month. For example, when a number of packets transmitted to or received from "Sweden" for one month exceeds "1,000", "Sweden" may be excluded from the blocked countries.

FIG. 3 illustrates an example of a country-by-country IP DB according to an embodiment of the present invention.

A country-by-country IP DB may be configured to maintain a country and IP addresses corresponding to the country. For example, IP addresses used in Korea may be stored in the country-by-country IP DB in association with Korea, and IP addresses used in the U.S. may be stored in the country-by-country IP DB in association with the U.S.

A network security device may identify an external IP address by extracting at least one of a source IP address and a destination IP address of a communication packet transmitted on a network. In detail, the network security device may maintain a country identified through the country-by-country IP DB and an external IP address corresponding to the country in the country-by-country IP DB, and identify a country corresponding to an identified external IP address.

Referring to FIG. 3, for example, when an IP address is 192.168.7.190, a country to which the IP address belongs may be identified as Korea through the country-by-country IP DB. When an IP address is 222.122.195.5, a country to which the IP address belongs may be identified as the U.S. through the country-by-country IP DB. In this example, an IP address is an address system of Internet Protocol version 4 (IPv4), and may be stored in a form of XXX.XXX.XXX.XXX with a maximum of 12 digits in the country-by-country IP DB. The network security device may also store an address system of Internet Protocol version 6 (IPv6) in the country-by-country IP DB, in addition to the address system of IPv4. Further, the country-by-country IP DB may be automatically updated.

In another example, IP addresses corresponding to a country may be stored in a form of a range in the country-by-country IP DB. For example, IP addresses belonging to a country A may be stored in the country-by-country IP DB, in a form of "from 192.168.7.190 to 192.168.7.200" or "from 192.168.8.21 to 192.168.8.100".

FIG. 4 illustrates an example of a blocked country DB according to an embodiment of the present invention.

A blocked country DB may be configured to maintain information related to a blocked country with which data communication is to be blocked. Referring to FIG. 4, for example, an administrator may not block data communication with Korea, but may block data communication with the U.S., Syria, and China with relatively high security risk.

When at least a predetermined number of packets are received from a first country during a predetermined time period, the first country may be registered as the blocked country in the blocked country DB. For example, when at least 1,000 packets are received from Syria for five minutes in a DDoS attack, Syria may be stored as the blocked country in the blocked country DB.

When at least a predetermined number of packets are transmitted to a first country during a predetermined time period, the first country may be registered as the blocked country in the blocked country DB. For example, it may be assumed that a PC of a user 2, among a plurality of PCs, is used for a DDoS attack. When at least 5,000 packets are transmitted to China for ten minutes, China may be registered as the blocked country in the blocked country DB.

When at least a predetermined number of packets are transmitted to or received from a first country during a predetermined time period, the first country may be excluded from the blocked countries in the blocked country DB. In this example, when at least the predetermined number of packets are transmitted to or received from the first country during the predetermined time period, the first country may be displayed to the administrator, and excluded from the blocked countries in the blocked country DB in accordance with an instruction of the administrator. For example, it may be assumed that all countries are blocked in the blocked country DB. When a PC of a user 3 is used to transmit or receive at least 100 packets to or from the U.S. for one month, the U.S. may be displayed to the administrator, and the administrator may exclude the U.S. from the blocked countries in the blocked country DB.

The blocked country DB may change whether each country is to be blocked in accordance with an instruction of the administrator.

FIG. 5 illustrates another example of a blocked country DB according to an embodiment of the present invention.

A blocked country DB may be configured to maintain information related to a blocked country with which communication is to be blocked, in association with at least one of a user identifier, a user IP address, a communication protocol, and a communication port. In this example, an external IP address may be identified by extracting at least one of a source IP address and a destination IP address of a communication packet transmitted on a network, and at least one of a user identifier, a user IP address, a communication protocol, and a communication port of the communication packet may be extracted.

A network security device may identify a country to which the external IP address belongs, and determine whether at least one of the source IP address and the destination IP address of the communication packet is associated with the blocked country in the blocked country DB.

For example, referring to FIG. 5, an IP address of a PC of a user ABC is 192.168.7.190, a country corresponding to the IP address, Korea, may be blocked, and a country corresponding to an IP address of a PC of a user AAA, Korea, may be allowed. Further, depending on types of a plurality of communication protocols, it may be set to block TCP, allow HTTP, and block SMTP with respect to the IP address of 192.168.7.190. Depending on communication ports, whether a communication packet is to be blocked may be set to allow a port 80, and block a port 88. In this example, when at least one of the source IP address and the destination IP address of the communication packet is maintained in the blocked country DB in association with the blocked country, the communication packet may be blocked.

As described with reference to FIG. 4, when at least a predetermined number of packets are received from a first country during a predetermined time period, the first country may be registered as the blocked country in the blocked country DB. Further, when at least a predetermined number of packets are transmitted to a first country during a predetermined time period, the first country may be registered as the blocked country in the blocked country DB. When at least a predetermined number of packets are transmitted to or received from a first country during a predetermined time period, the first country may be excluded from the blocked country in the blocked country DB.

The blocked country DB may set whether a communication packet is to be blocked with respect to at least one of a country, a user ID, a PC IP address, a communication protocol, and a communication port, and change whether the communication packet is to be blocked in accordance with an instruction of the administrator.

FIG. 6 illustrates an example of a structure of a communication packet according to an embodiment of the present invention.

A communication packet transmitted on a network may be a formatted block of data transmitted by a computer network. FIG. 6 illustrates a structure of an IP packet, among communication packets.

An IP header is a portion at a front of the IP packet, the portion containing a variety of control information such as an address. The IP header may include, for example, fields of a source IP address, a destination IP address, identification, flags, a fragment offset, a protocol, a header checksum, a TTL, and an option. In this example, when the IP packet corresponds to an IPv4 packet, each of the source IP address and the destination IP address may be a 32-bit address. When the IP packet corresponds to an IPv6 packet, each of the source IP address and the destination IP address may be a 128-bit address. The sizes of the source IP address and the destination IP address may vary depending on a version of an IP packet to be developed additionally.

The source IP address may be an IP address of a point of departure. For example, when data is transmitted from a PC a in the U.S. to a PC 1 in Korea, the source IP address may corresponds to the U.S. The destination IP address may be an IP address of a destination. For example, when data is transmitted from a PC 2 in Korea to a PC b in the U.S., the destination IP address may correspond to the U.S.

A network security device may identify an external IP address by extracting at least one of the source IP address and the destination IP address from the communication packet. The network security device may identify a country to which the identified external IP address belongs, and block the communication packet when the identified country corresponds to the blocked country.

FIG. 7 is a flowchart illustrating a network security method of a network security device according to an embodiment of the present invention.

A network security method may be performed by a network security device. The descriptions provided with reference to FIGS. 1 through 6 may be applicable to the network security device.

In operation 710, the network security device may maintain information related to a blocked country with which data communication is to be blocked in a blocked country DB.

In operation 720, the network security device may identify an external IP address by extracting at least one of a source IP address and a destination IP address of a communication packet transmitted on a network.

In operation 730, the network security device may identify a country to which the identified external IP address belongs. Referring to FIG. 3, the network security device may identify the country to which the external IP address belongs from the identified external IP address through a country-by-country IP DB.

In operation 740, the network security device may block the communication packet when the identified country corresponds to the blocked country. For example, the identified country may correspond to the U.S. Referring to FIG. 4, the U.S. corresponds to a blocked country, and thus the network security device may block the communication packet. When the identified country does not correspond to the blocked country, the network security device may allow the communication packet to pass.

Figure 8:
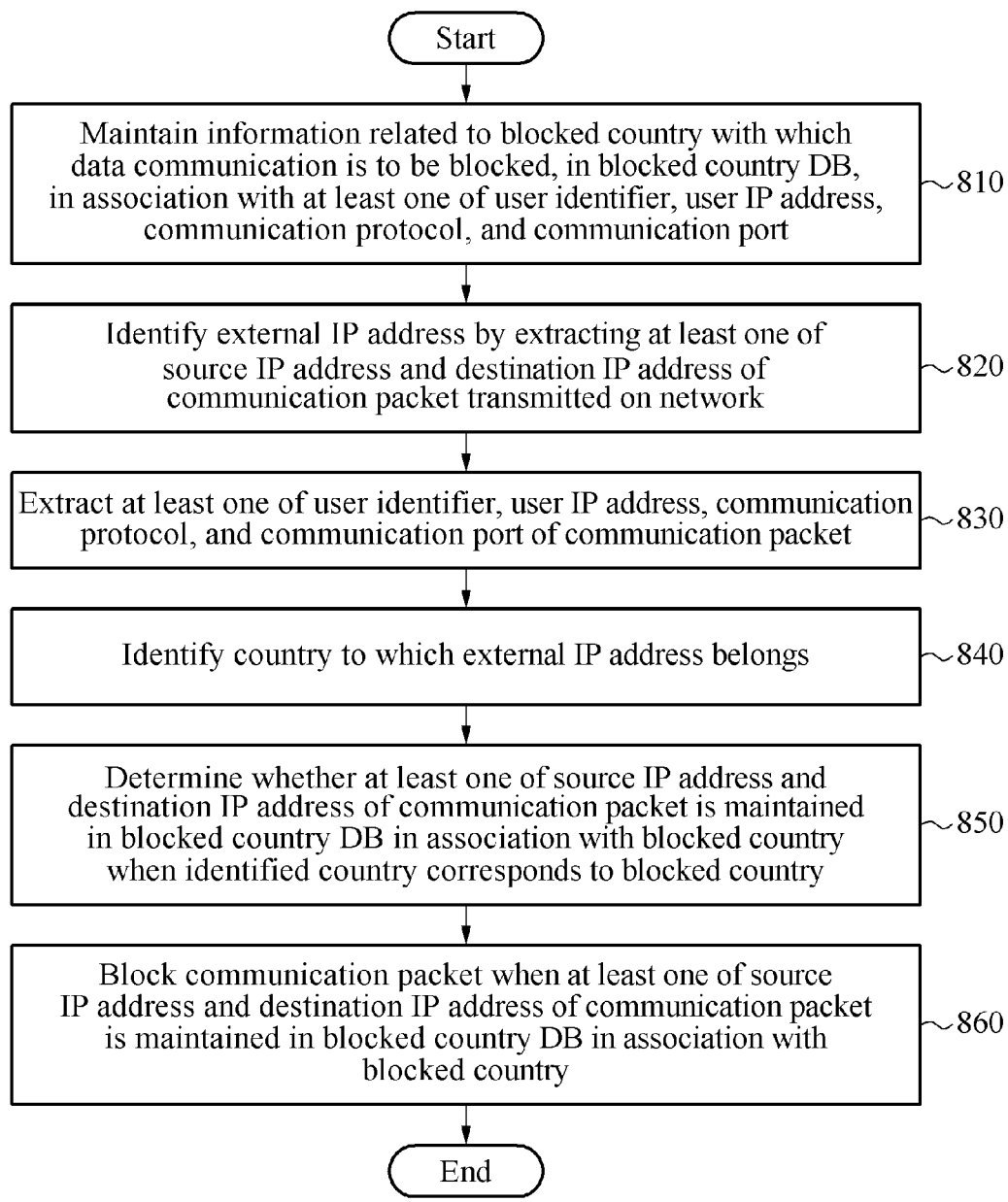
FIG. 8 is a flowchart illustrating a network security method of a network security device according to an embodiment of the present invention.

FIG. 8 is a flowchart illustrating a network security method of a network security device according to an embodiment of the present invention.

A network security method may be performed by a network security device. The descriptions provided with reference to FIGS. 1 through 6 may be applicable to the network security device, and thus duplicated descriptions will be omitted for conciseness.

In operation 810, the network security device may maintain information related to a blocked country with which data communication is to be blocked, in association with at least one of a user identifier, a user IP address, a communication protocol, and a communication port.

In operation 820, the network security device may identify an external IP address by extracting at least one of a source IP address and a destination IP address of a communication packet transmitted on a network.

In operation 830, the network security device may extract at least one of a user identifier, a user IP address, a communication protocol, and a communication port of the communication packet.

In operation 840, the network security device may identify a country to which the external IP address belongs.

In operation 850, the network security device may determine whether at least one of the source IP address and the destination IP address of the communication packet is maintained in a blocked country DB in association with the blocked country when the identified country corresponds to the blocked country.

In operation 860, the network security device may block the communication packet when at least one of the source IP address and the destination IP address of the communication packet is maintained in the blocked country DB in association with the blocked country.

According to an embodiment, a network security device may block communication with a security threatening country using a blocked country DB and a country-by-country IP DB, based on an IP address of a communication packet transmitted on a network.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A network security method implemented by a network security device, comprising:
   maintaining information related to a blocked country with which data communication is to be blocked, in a blocked country database (DB);
   identifying an external Internet Protocol (IP) address by extracting at least one of a source IP address and a destination IP address of a communication packet transmitted on a network;
   identifying a country to which the identified external IP address belongs;
   blocking the communication packet when the identified country corresponds to the blocked country;
   maintaining a country and an IP address corresponding to the country in a the country-by-country IP DB; and
   identifying a country corresponding to the identified external IP address by referring to the country-by-country IP DB,
   wherein the maintaining comprises:
      registering all countries as blocked countries in the blocked country DB;
      excluding a first country from the blocked countries in the blocked country DB when at least a predetermined first number of packets are transmitted to and received from the first country during a predetermined first time period;
      displaying the first country to an administrator when at least the predetermined first number of packets are transmitted to and received from the first country during the predetermined first time period; and
      excluding the first country from the blocked countries in the blocked country DB in accordance with an instruction of the administrator,
   wherein the maintaining comprises registering the first country as the blocked country in the blocked country DB when at least a predetermined second number of packets are received from and transmitted to, the first country during a predetermined second time period.

2. A network security method implemented by a network security device, comprising:
   maintaining information related to a blocked country with which data communication is to be blocked, in a blocked country database (DB), in association with at least one of a user identifier, a user Internet Protocol (IP) address, a communication protocol, and a communication port;
   identifying an external IP address by extracting at least one of a source IP address and a destination IP address of a communication packet transmitted on a network;
   extracting at least one of a user identifier, a user IP address, a communication protocol, and a communication port of the communication packet;

identifying a country to which the external IP address belongs;

determining whether at least one of the source IP address and the destination IP address of the communication packet is maintained in the blocked country DB in association with the blocked country when the identified country corresponds to the blocked country; and blocking the communication packet when at least one of the source IP address and the destination IP address of the communication packet is maintained in the blocked country data base in association with the blocked country, wherein the maintaining comprises:

registering all countries as blocked countries in the blocked country DB;

excluding a first country from the blocked countries in the blocked country DB when at least a predetermined first number of packets are transmitted to and received from the first country during a predetermined first time period;

displaying the first country to an administrator when at least the predetermined first number of packets are transmitted to and received from the first country during the predetermined first time period; and excluding the first country from the blocked countries in the blocked country DB in accordance with an instruction of the administrator, wherein the maintaining comprises registering the first country as the blocked country in the blocked country DB when at least a predetermined second number of packets are received from and transmitted to, the first country during a predetermined second time period.

* * * * *